United States Patent
Tateishi et al.

(10) Patent No.: US 6,630,823 B2
(45) Date of Patent: Oct. 7, 2003

(54) ROTATION ANGLE DETECTOR

(75) Inventors: Ichiro Tateishi, Fukui (JP); Hisashi Nishikawa, Shiga (JP); Takashi Ichimura, Fukui (JP); Satoru Fukui, Fukui (JP); Yoshiyuki Nakade, Fukui (JP); Masahide Onishi, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/052,775

(22) Filed: Jan. 23, 2002

(65) Prior Publication Data

US 2002/0097044 A1 Jul. 25, 2002

(30) Foreign Application Priority Data

Jan. 23, 2001 (JP) .......................... 2001-014142

(51) Int. Cl.[7] .................................. G01B 7/30
(52) U.S. Cl. .............................. 324/207.25; 324/207.21
(58) Field of Search ........................ 324/207.21, 207.22, 324/207.23, 207.24, 207.25; 74/491, 492, 495

(56) References Cited

U.S. PATENT DOCUMENTS 5,146,173 A * 9/1992 Jurkewitz .................... 324/714
5,930,905 A * 8/1999 Zabler et al. ................. 33/1 PT
6,507,188 B1 * 1/2003 Dilger et al. .......... 324/207.25

FOREIGN PATENT DOCUMENTS

| EP | 1 018 466 | 7/2000 |
| EP | 1 093 993 | 4/2001 |
| EP | 1 108 987 | 6/2001 |

* cited by examiner

Primary Examiner—Jay Patidar
Assistant Examiner—Reena Aurora
(74) Attorney, Agent, or Firm—Wenderoth, Lind & Ponack L.L.P.

(57) ABSTRACT

In a rotation-angle detector, a first detector detects a movement of a driven body following the rotation of a change gear engaged with a rotary gear of a rotary body, and outputs the detection result as a detection signal which gradually increases or decreases. At the same time, a second detector detects a rotation of a detecting gear engaged with the change gear or directly with the rotary gear of the rotary body and outputs the detection result as a detection signal which repeats continuously. A detecting circuit detects a rotation angle of the rotary body based on these two detection signals. This structure allows the rotation-angle detector to produce a smaller detection error, and be downsized. Further, only a simple calculation in the detecting circuit is necessary.

20 Claims, 14 Drawing Sheets

FIG. 4A
FIG. 4B

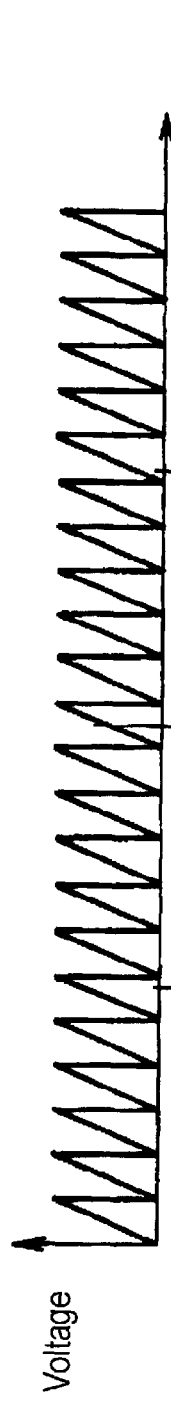
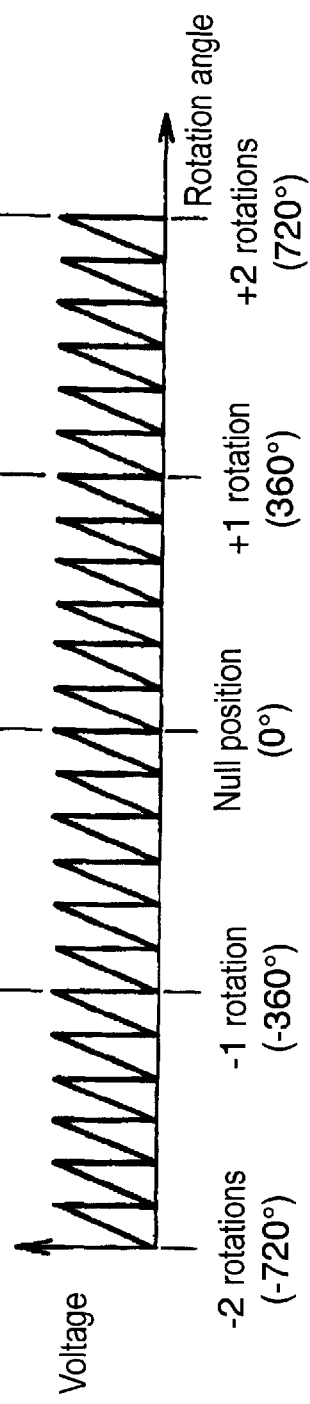
FIG. 13A PRIOR ART
FIG. 13B PRIOR ART

ROTATION ANGLE DETECTOR

FIELD OF THE INVENTION

The present invention relates to a rotation-angle detector for detecting a rotation angle of, e.g., a steering shaft of a car.

BACKGROUND OF THE INVENTION

Recently, cars have been provided with a variety of functions and various controls are thus required. For that purpose, cars are equipped with rotation-angle detectors car for detecting a rotation angle of the steering shaft.

A conventional rotation-angle detector is described hereinafter with reference to FIG. 11 through FIG. 14B. FIG. 11 is a perspective view of a conventional rotation-angle detector. FIG. 12 is a sectional view of the detector shown in FIG. 11. FIGS. 13A and 13B show voltage-waveforms with respect to a rotation angle detected by the detector shown in FIG. 11. FIGS. 14A and 14B show enlarged voltage-waveforms shown in FIGS. 13A and 13B.

In FIG. 11 and FIG. 12, rotary body 501, on whose rim rotary-gear 511 is formed, engages first detecting gear 502 and second detecting gear 503, and gears 502 and 503 have different numbers of cogs.

The numbers of cogs of gears 502 and 503 are set such that the numbers have periodicity with respect to a given rotation-angle of rotary body 501. In other words, when rotary body 501 rotates twice counterclockwise or clockwise from a null position, rotary body 501 is to return to an original engaging relation at the null position.

Inside the rim of rotary body 501, two engaging sections 512 are provided for engaging the steering shaft (not shown) extending through the center of rotary body 501. Gears 502 and 503 have magnets 504 and 505 at their centers.

Circuit-board 506 is placed above gears 502 and 503, and board 506 is equipped with first angle-sensor 507 and second angle-sensor 508 facing, respectively, the centers of gear 502 and gear 503. Further, board 506 has detecting circuit 509 comprising a micro-processor for processing detection signals supplied from sensors 507 and 508.

An operation of the rotation-angle detector discussed above is described hereinafter. In FIG. 11, when the steering shaft rotates, the torque is transmitted to rotary body 501 via the two engaging sections 512, so that rotary gear 511 rotates. The rotation of gear 511 causes gears 502 and 503 engaged with gear 511 to rotate, respectively. At this time, sensors 507 and 508 detect magnetism from magnets 504 and 505, whereby the rotation angles of gears 502 and 503 are detected.

Detection signals detected by sensors 507 and 508 are shown in FIGS. 13A and 13B. Since gears 502 and 503 have different numbers of cogs, the detection signals draw voltage-waveforms having rather different phases from each other with respect to their rotation angles while rotary body 501 rotates twice either clockwise or counterclockwise.

As the enlarged voltage-waveform in FIG. 14 shows, detecting circuit 509 detects voltages of sensors 507 and 508 (i.e., they are the detection signals) and calculates the voltages as well as the numbers of cogs of gears 502 and 503, so that rotation angle $\theta$ of rotary body 501 is detected.

However, the conventional detector discussed above has encountered the following problems:

(a) The rotation angle of rotary body 501 is detected based on detecting the rotations of detection gears 502 and 503 engaged with rotary gear 511. Therefore, gaps between gears 511 and 502, as well as gaps between gears 511 and 503, and looseness due to these gaps cause an error in detecting an angle, particularly when the gears start rotating or rotate in a reverse direction.

(b) Detecting a rotation angle requires complicated calculations by detecting circuit 509.

(c) When a large rotation angle is detected, respective gears 511, 502 and 503 need to have greater numbers of cogs due to a periodic relationship between gear 511 and gears 502, 503. As a result, larger diameters are necessary, which prevents the entire detector from being downsized.

SUMMARY OF THE INVENTION

The present invention addresses the problems discussed above, and aims to provide a downsized rotation-angle detector that produces a smaller detection error, and a simpler calculation is carried out in a detecting circuit thereof.

The rotation-angle detector of the present invention comprises the following elements: a rotary body having a rotary gear; a change gear engaged with the rotary gear; a driven body moving following the rotation of the change gear, a first detector for detecting a movement of the driven body; a detecting gear engaged with the change gear; a second detector for detecting a rotation of the detecting gear; and a detecting circuit for processing detection signals supplied from the first and the second detectors. The first detector detects the movement of the driven body as a first detection signal gradually increasing or decreasing, and the second detector detects the rotation of the detecting gear as a second detection signal repeating continuously. The detecting circuit detects a rotation angle of the rotary body based on the two detection signals. This structure allows the detector of the present invention to produce a smaller error, be downsized, and make simple calculation in the detecting circuit.

BRIEF DESCRIPTION OF THE DRAWINGS

FIGS. 4A and 4B show voltage-waveforms with respect to a rotation angle detected by the detector shown in FIG. 1.

FIGS. 13A and 13B show voltage-waveforms detected by the detector shown in FIG. 11.

DETAILED DESCRIPTION OF THE INVENTION

First Exemplary Embodiment

Figure 1:
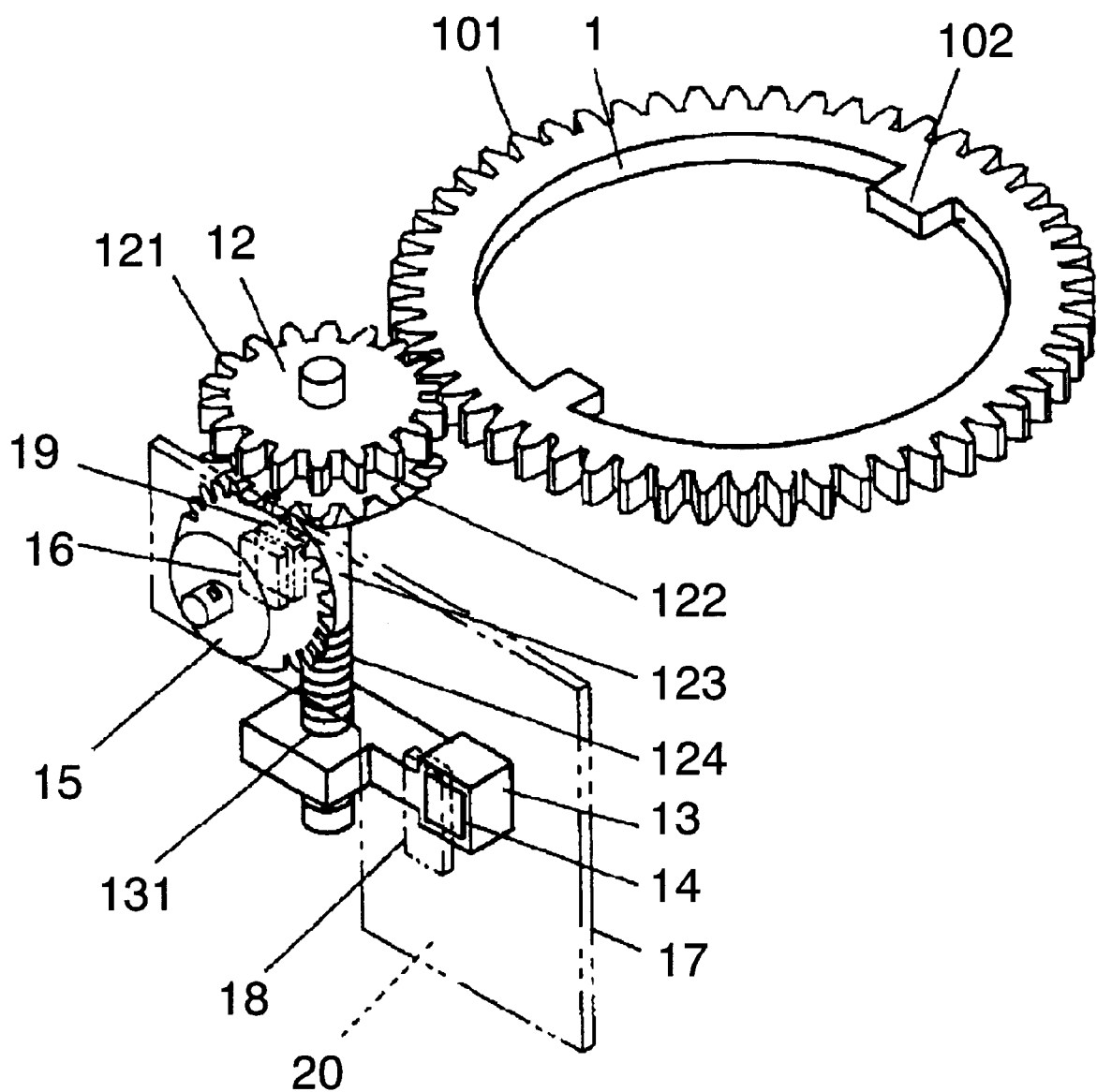
FIG. 1 is a perspective view of a rotation-angle detector in accordance with a first exemplary embodiment of the present invention.
Figure 2:
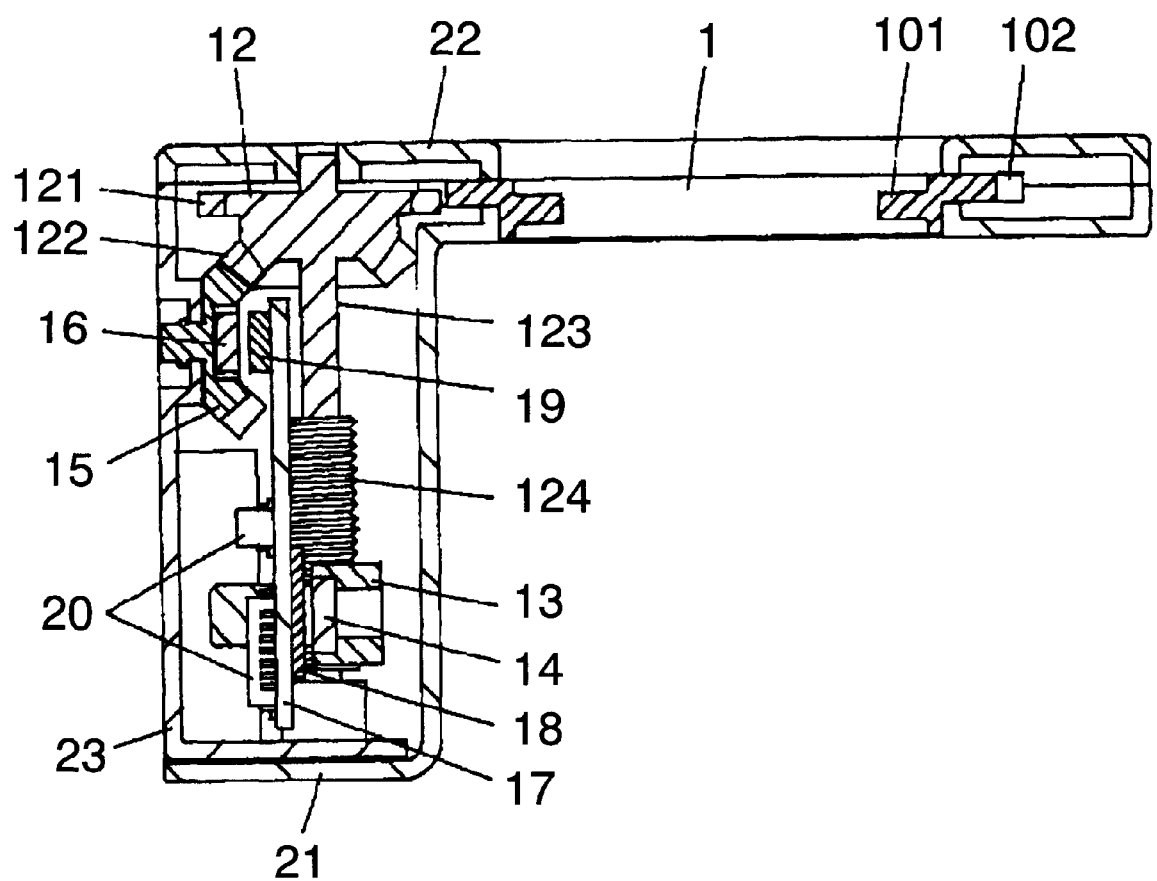
FIG. 2 is a sectional view of the detector shown in FIG. 1.
Figure 3:
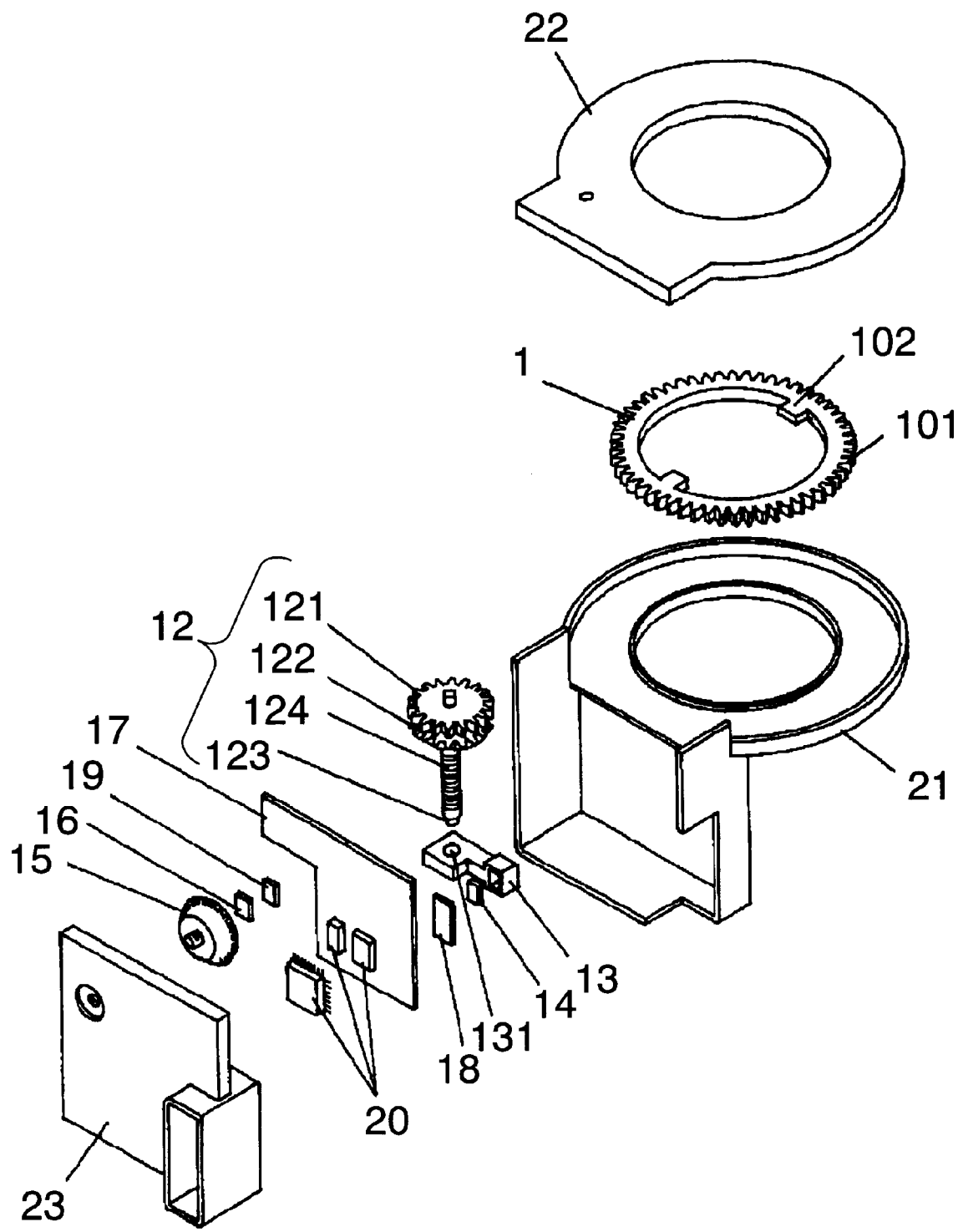
FIG. 3 is an exploded perspective view of the detector shown in FIG. 1.
Figure 5A:
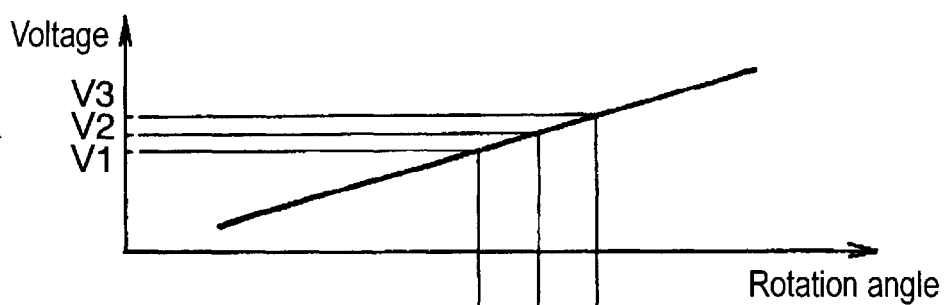
FIGS. 5A and 5B show enlarged voltage-waveforms shown in FIGS. 4A and 4B.
Figure 5B:
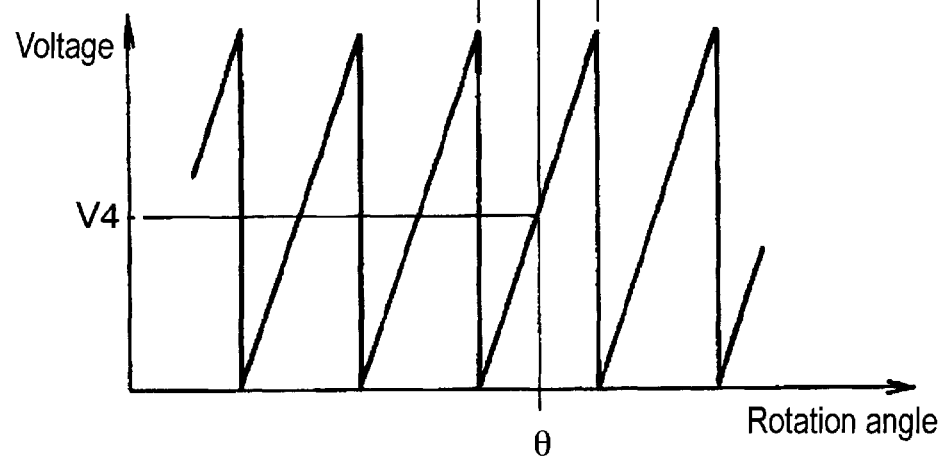

FIG. 1 is a perspective view of a rotation-angle detector in accordance with the first exemplary embodiment of the present invention. FIG. 2 is a sectional view of the detector shown in FIG. 1. FIG. 3 is an exploded perspective view of the detector. FIGS. 4A and 4B show voltage-waveforms with respect to a rotation angle detected by the detector. FIGS. 5A and 5B show enlarged voltage-waveforms shown in FIGS. 4A and 4B.

First, a structure of the rotation-angle detector in accordance with the first embodiment is demonstrated with reference to FIGS. 1, 2 and 3. In FIG. 1, two engaging sections 102 are provided inside rotary body 1 for engaging a steering shaft (not shown) extending through the center of rotary body 1. Rotary gear 101 is provided on a rim of rotary body 1. Gear 101 engages spur gear 121 of change gear 12.

In change gear 12, bevel gear 122 is provided under spur gear 121 and shaft 123 extends downward from the center of spur gear 121. Helical screw 124 is formed on an outer wall of shaft 123. Driven body 13, of which inner hole 131 has the counterpart helical tap for helical screw 124, is engaged with screw 124 and movable up and down. On a side wall of driven body 13, magnet 14 is mounted. Bevel gear 122 is engaged with detecting gear 15 which also has another bevel gear. At the center (i.e. center of rotation, as shown in FIGS. 1–3) of gear 15, magnet 16 is mounted.

Further, circuit board 17 is arranged substantially parallel to shaft 123. On the rear side of board 17, magnetism detecting element 18, such as an antiparallel magneto-resistance element (GMR element), is mounted at a place facing a side face of driven body 13. Magnet 14 and detecting element 18 constitute a first detector. On a surface of board 17, magnetism detecting element 19, such as an anisotropic magneto-resistance element (AMR element), is mounted at a place facing the center of detecting gear 15. Magnet 16 and detecting element 19 constitute a second detector. On both sides of board 17, a plurality of wiring patterns (not shown) are formed, and detecting circuit 20 including a microprocessor which processes detection signals from detecting elements 18 and 19 is formed.

In FIGS. 2 and 3, housing 21 made of insulating resin and covers 22, 23 position and accommodate rotary body 1, respective gears, board 17 and the like, so as to form the rotation-angle detector.

Next, an operation of the detector discussed above is demonstrated. When the steering shaft rotates, rotary gear 101 unitarily formed with rotary body 1 rotates, which allows change-gear 12 to rotate, whose spur gear 121 is engaged with gear 101. The rotation of gear 12 causes driven-body 13 to move up and down because inner hole 131 engages screw 124 formed on shaft 123.

The numbers of cogs of gears 101, 121, and the numbers of threads of screws 124, 131 are determined such that when a rotation-angle of rotary body 1 reaches a given angle (for instance, the steering shaft rotates three revolutions in both directions) driven body 13 moves up or down by 10 mm, respectively.

Magnetism detecting element 18 detects the magnetism of magnet 14 mounted to driven body 13, thereby outputting a voltage as a detection signal with respect to a rotation-angle as shown in FIG. 4A. At this time, the first detector comprising magnet 14 and element 18 detects a linear movement of driven body 13 as stronger and weaker magnetism, thereby outputting a linear voltage-waveform increasing gradually.

At the same time, detecting gear 15 engaging bevel-gear 122 of change-gear 12 rotates, and magnetism detecting-element 19 detects the magnetism of magnet 16 mounted at the center of gear 15. Then element 19 outputs a voltage, as shown in FIG. 4B, with respect to a rotation-angle. At this time, the second detector comprising magnet 16 and element 19 detects a rotation of gear 15 as stronger and weaker magnetism, and outputs a voltage-waveform repeating continuously.

Detecting circuit 20 formed on board 17 detects a rotation angle of rotary body 1 (i.e., a rotation angle of the steering shaft) based on the two detection signals from elements 18 and 19. This operation of detecting the rotation angle is detailed with reference to FIG. 5.

As shown in the expanded voltage-waveform of FIG. 5, detecting circuit 20 detects any rotation-angle $\theta$ of rotary body 1. To be more specific, firstly, circuit 20 detects voltage V2 between voltages V1 and V3 from a linear voltage-waveform supplied by element 18, then detects an approximate rotation angle out of the entire angels subjected to the detection.

Detecting circuit 20 then determines to which section the voltage-waveform—supplied from element 19 and shown in FIG. 5B—belongs based on this approximate rotation angle. Voltage V4 in the determined section of the waveform is detected before rotation-angle $\theta$ is specifically determined.

In this case, a number of cogs of detecting gear 15 is set at a quarter of the number of cogs of rotary gear 101, so that element 19 can detect a rotation of as much as 180 degree. As a result, as shown in FIG. 4B, a detection signal from element 19 draws a waveform repeating periodically every 45 degree rotation of rotary body 1. When the microprocessor disposed in detecting circuit 20 calculates this waveform with 10-bit A/D converter, the resolving power of circuit 20 becomes 1024 (two signals, i.e., 0 and 1, are tenth powered). Detecting circuit 20 thus detects a rotation angle by a high resolving power such as $45/1024 \approx 0.04$ degree.

According to the first embodiment as discussed above, the first detector detects an approximate rotation angle of rotary body 1, then the second detector detects the rotation angle more accurately based on the approximate angle. Therefore, a smaller detection error, simpler calculations in detecting circuit 20 and downsizing of the entire detector can be expected.

Both of the detectors are constructed by magnets 14, 16 and detecting elements 18, 19, whereby a stable detection by a non-contacting method is achievable with a simple structure.

Since elements 18, 19 are mounted on opposite sides of board 17 and arranged substantially parallel with shaft 123, (see FIGS. 2 and 3) board 17 can cut off the interference caused by magnetic-force lines from each other for to avoid detection errors.

Further, if a detection signal is supplied only from either one of the detectors, detecting circuit 20 would sense this status and output a certain signal to notify a user of the status. This structure allows the user to detect a malfunction.

In this first embodiment, detecting gear 15 having a bevel gear engages bevel gear 122 of change gear 12. However, a detecting gear having a spur gear is mounted with a magnet, and the spur gear of the detecting gear engages a spur gear of a change gear so that the spur gear of the detecting gear can be placed parallel with the rotary body.

Second Exemplary Embodiment

Figure 6:
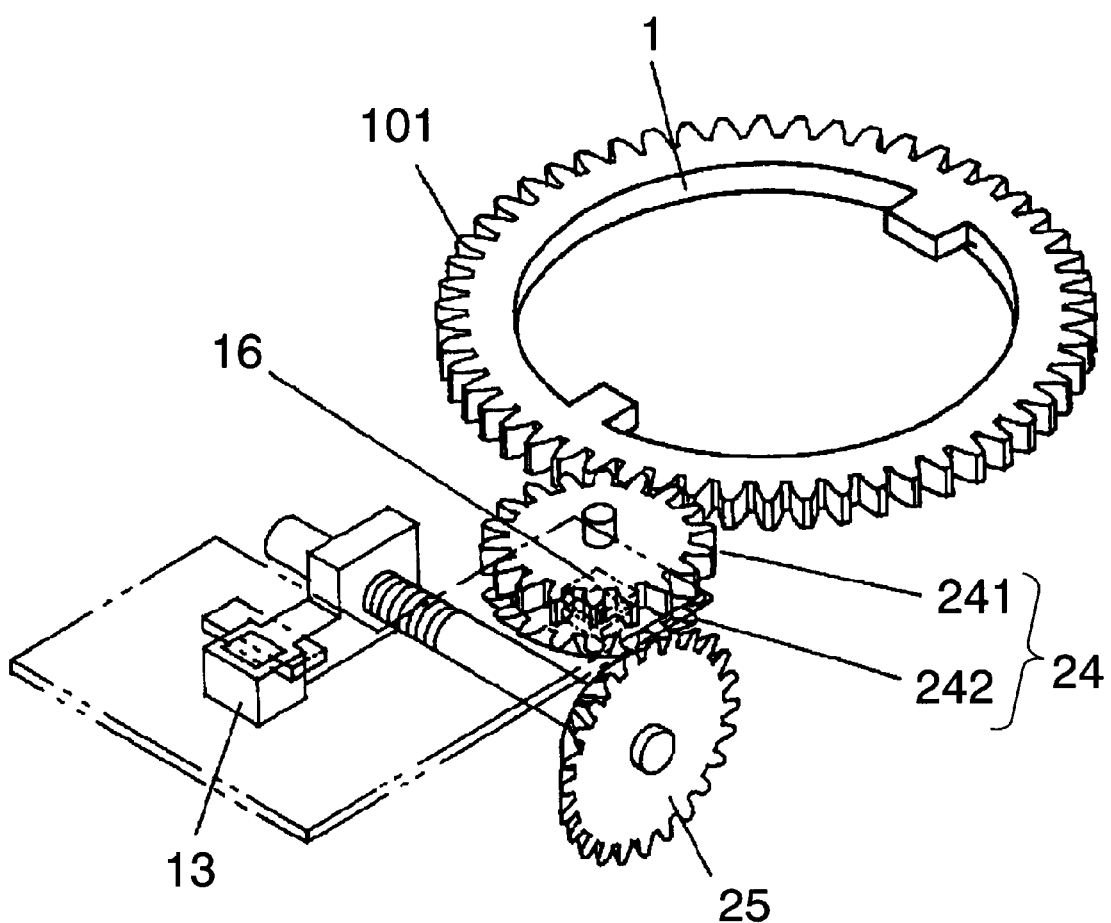
FIG. 6 is a perspective view of a rotation-angle detector in accordance with a second exemplary embodiment of the present invention.

FIG. 6 is a perspective view of a rotation-angle detector in accordance with the second embodiment of the present invention. In the first embodiment discussed previously, rotary gear 101 of rotary body 1 engages spur gear 121 of change-gear 12, and bevel gear 122 under spur gear 121 is engaged with detecting gear 15 while driven-body 13 moves up and down. However, in this second embodiment, as shown in FIG. 6, driven body 13 is moved parallel with rotary body 1 (i.e., within a plane parallel to the plane of rotary body 1).

To be more specific, the gears in accordance with the second embodiment are structured as follows: spur gear 241 of detecting gear 24 is directly engaged with rotary gear 101, and bevel gear 242 of detecting gear 24 is engaged with change gear 25 which also has a bevel gear. At the same time, magnet 16 is mounted to detecting gear 24, thereby forming a second detector. This structure allows detecting gear 24, of which rotation is detected by the second detector, to engage rotary gear 101 directly. As a result, looseness is reduced and a smaller detection error can be expected.

Third Exemplary Embodiment

Figure 7:
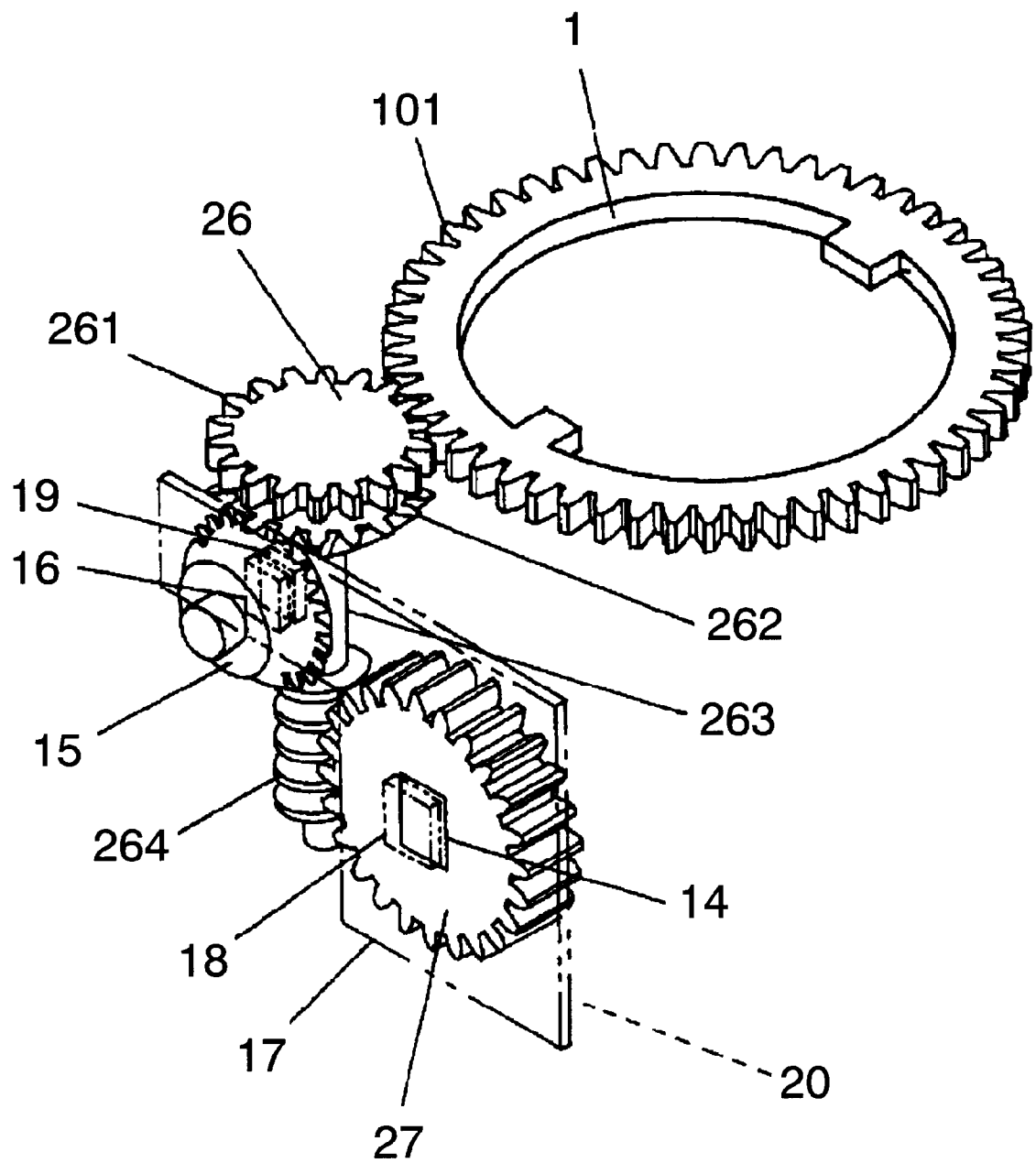
FIG. 7 is a perspective view of a rotation-angle detector in accordance with a third exemplary embodiment of the present invention.

FIG. 7 is a perspective view of a rotation-angle detector in accordance with the third embodiment of the present invention. This third embodiment features a detector using a gear as a driven body (moved by rotations of a change gear) instead of the driven body described in the first embodiment.

The third embodiment is similar to the first one in the following points:

(1) Rotary gear 101 of rotary body 1, through the center of which a steering shaft extends, engages spur gear 261 of change gear 26; and (2) Bevel gear 262 of change gear 26 engages detecting gear 15 having a bevel gear, and magnet 16 is mounted at the center of detecting gear 15.

However, the third embodiment differs from the first embodiment in that worm gear 264 is formed on an outer surface (periphery) of shaft 263 extending downward from the center of change gear 26, and driven gear 27 engages worm gear 264.

Gear 27 rotates at a given reduced speed due to worm gear 264. For instance, driven gear 27 is designed to rotate one revolution while rotary gear 101 rotates 12 revolutions. At the center of gear 27, magnet 14 is mounted, and circuit-board 17 is arranged substantially parallel to shaft 263. On board 17, magnetism detecting element 18 included in the first detector is mounted at a place facing the center of driven gear 27, and magnetism detecting element 19 included in the second detector is mounted at a place facing the center of detecting gear 15. Further, board 17 has detecting circuit 20 including a micro-processor which processes both of the detection signals supplied from elements 18, 19.

An operation of the third embodiment is demonstrated hereinafter. When the steering shaft rotates, rotary gear 101 formed with rotary body 1 as a unit rotates, and change gear 26, of which spur gear 261 engages gear 101, also rotates. The rotation of change gear 26 rotates driven gear 27 via worm gear 264 of shaft 263.

Magnetism detecting element 18 detects the magnetism of magnet 14 mounted to gear 27. At this time, since gear 27 rotates at the given reduced speed, a detection signal from the first detector draws a line gradually increasing as shown in FIG. 4A. At the same time, when detecting gear 15 engaging bevel gear 262 of change gear 26 rotates, magnetism detecting element 19 detects the magnetism of magnet 16 mounted at the center of detecting gear 15. A detection signal from the second detector thus draws a repeating continuous line as shown in FIG. 4B.

Detecting circuit 20 disposed on circuit board 17 detects both of the detection signals supplied from elements 18, 19. Specifically, in the same manner as the first embodiment, circuit 20 detects an approximate rotation angle of rotary body 1 with the detection signal from element 18 of the first detector. Then circuit 20, based on the approximate rotation angle detected, detects the more accurate rotation angle of rotary body 1 using the detection signal from element 19 of the second detector. As a result, the third embodiment allows the rotation-angle detector to be downsized, produce a smaller detection error, and make calculations easier in the detecting circuit.

Fourth Exemplary Embodiment

Figure 8:
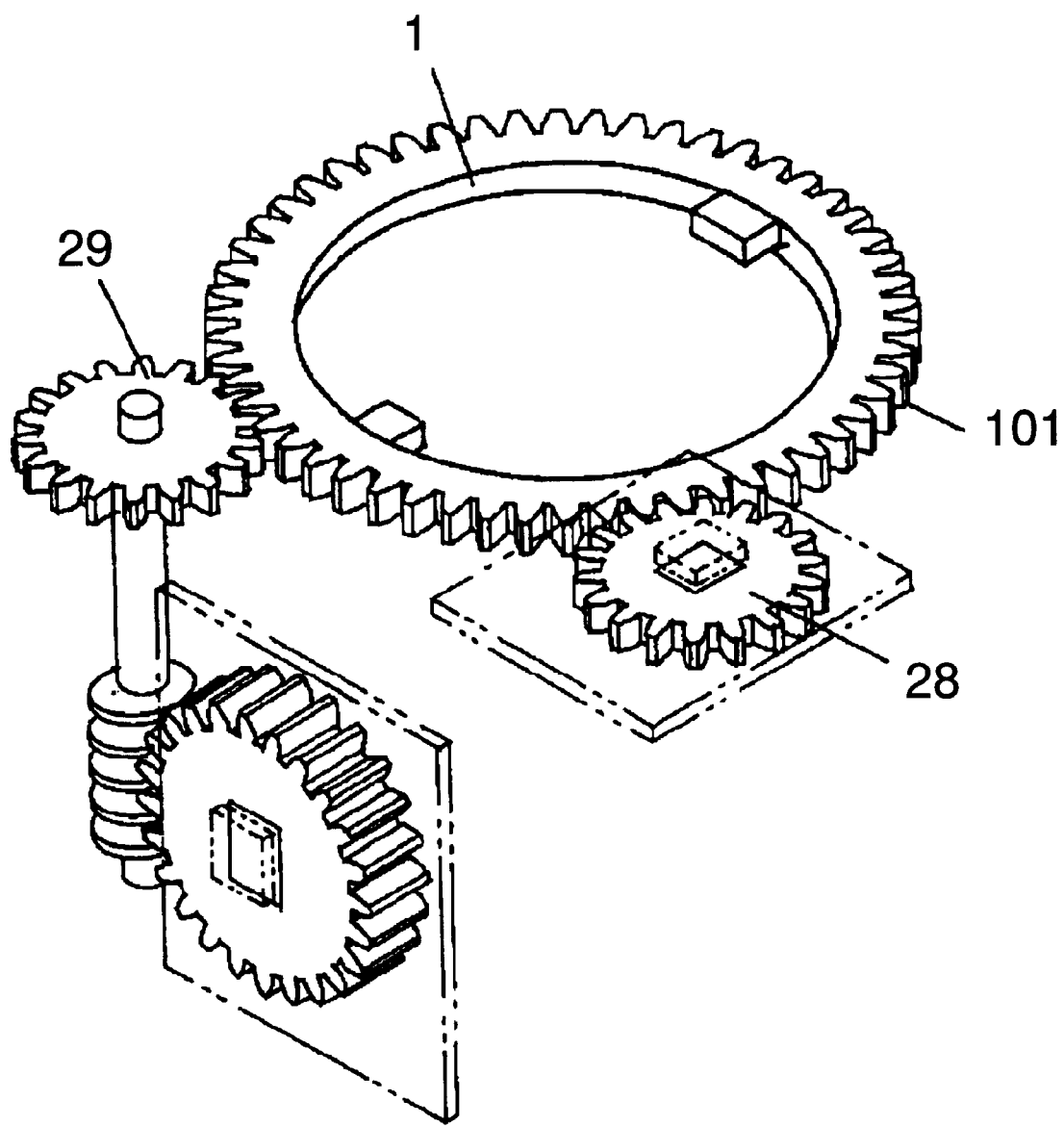
FIG. 8 is a perspective view of a rotation-angle detector in accordance with a fourth exemplary embodiment of the present invention.

FIG. 8 is a perspective view of a rotation-angle detector in accordance with the fourth embodiment of the present invention. As shown in FIG. 8, detecting gear 28 directly engages rotary gear 101 of rotary body 1, and the second detector detects a rotation angle with this detecting gear 28. This structure produces less looseness comparing with the arrangement in which change gear 29 is disposed between gears 28 and 101. As a result, much smaller detection errors can be expected.

Fifth Exemplary Embodiment

Figure 9:
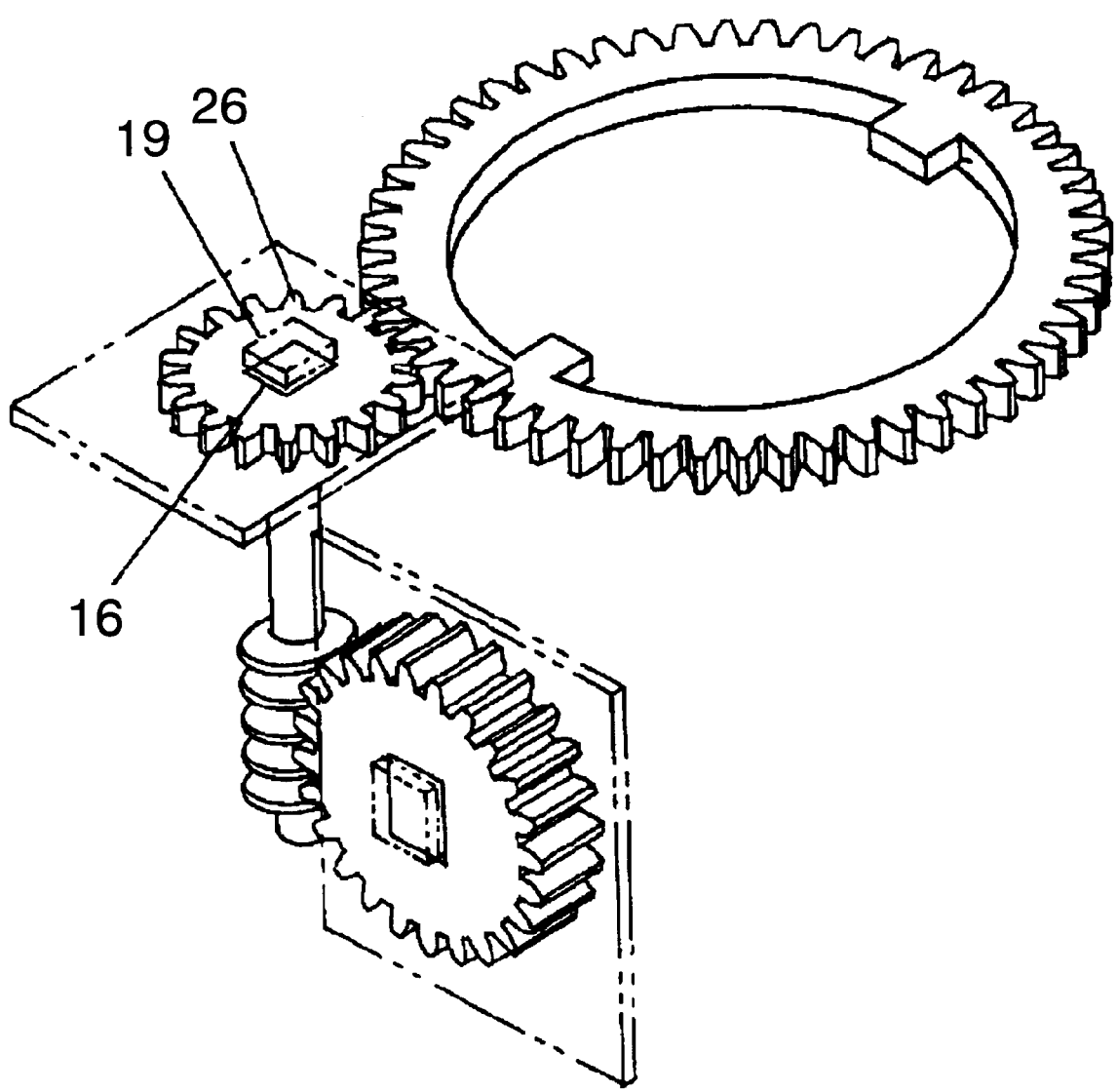
FIG. 9 is a perspective view of a rotation-angle detector in accordance with a fifth exemplary embodiment of the present invention.

FIG. 9 is a perspective view of a rotation-angle detector in accordance with the fifth embodiment. As shown in FIG. 9, the second detector comprises change (detecting) gear 26 having magnet 16, and magnetism detecting element 19 facing gear 26, instead of a separate change gear and detecting gear as in the first embodiment. A rotation of detecting gear 26 can be detected as a detection signal drawing a repeating continuous waveform. This structure does not need the separate change gear and detecting gear, and the rotation-angle detector thus can be formed using less components at inexpensive cost.

Sixth Exemplary Embodiment

Figure 10A:
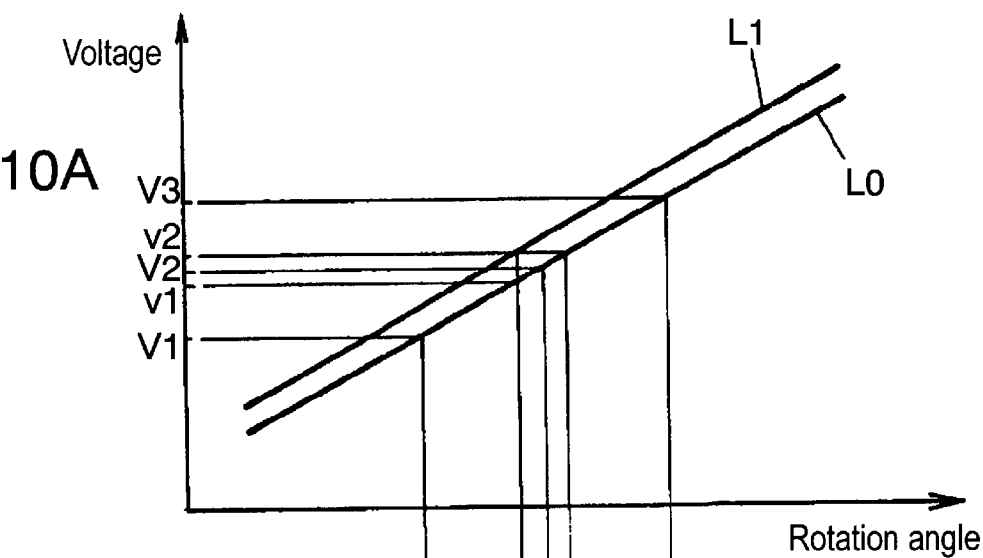
FIGS. 10A and 10B show enlarged voltage-waveforms detected by a rotation-angle detector in accordance with a sixth exemplary embodiment of the present invention.
Figure 10B:
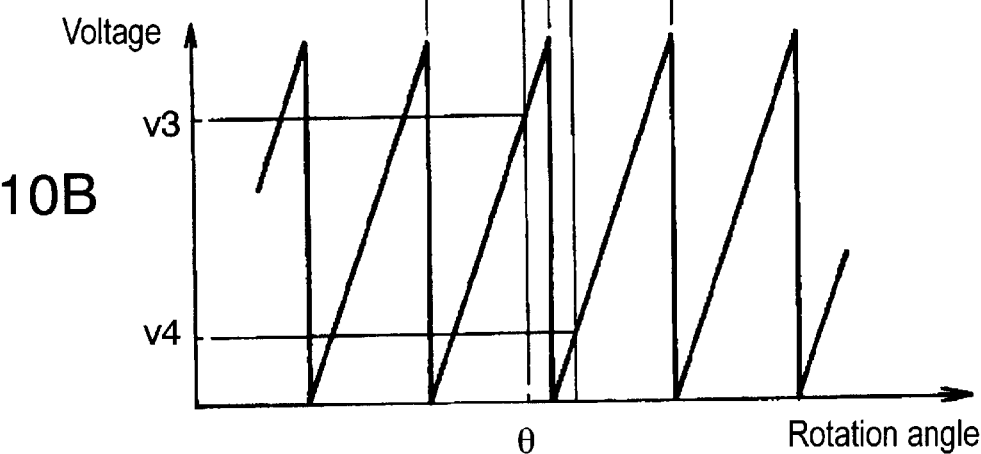
Figure 11:
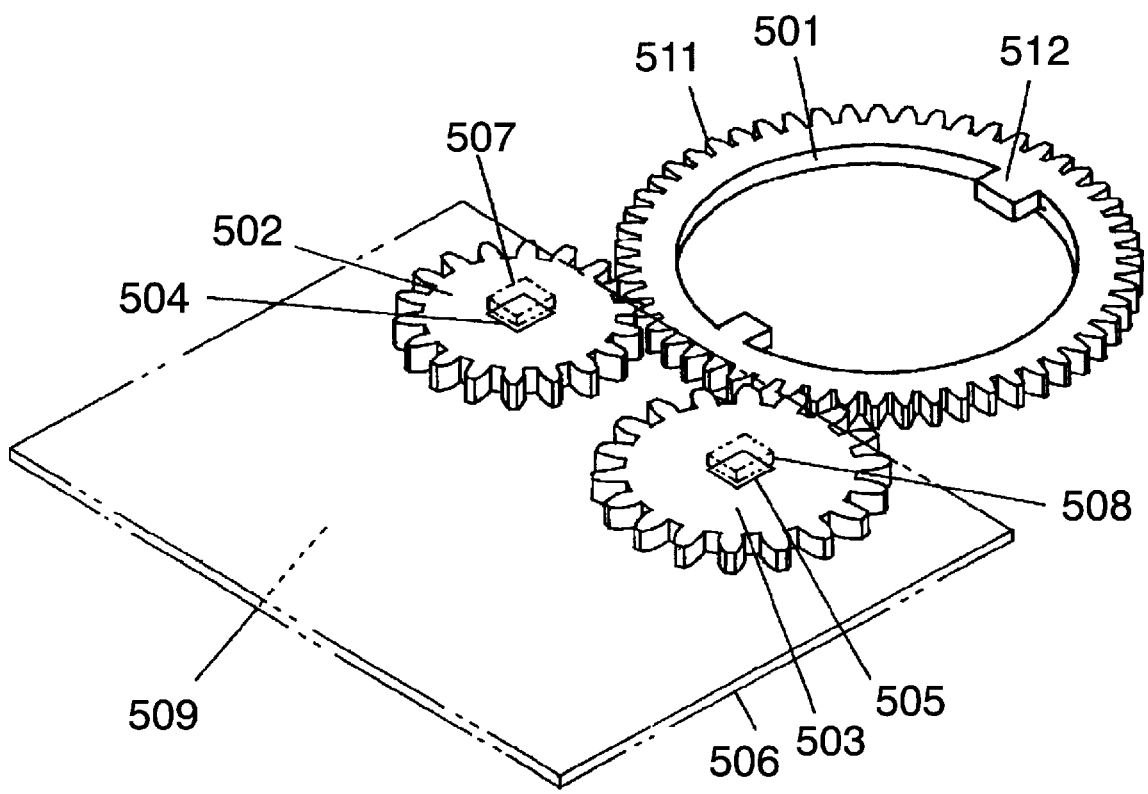
FIG. 11 is a perspective view of a conventional rotation-angle detector.
Figure 12:
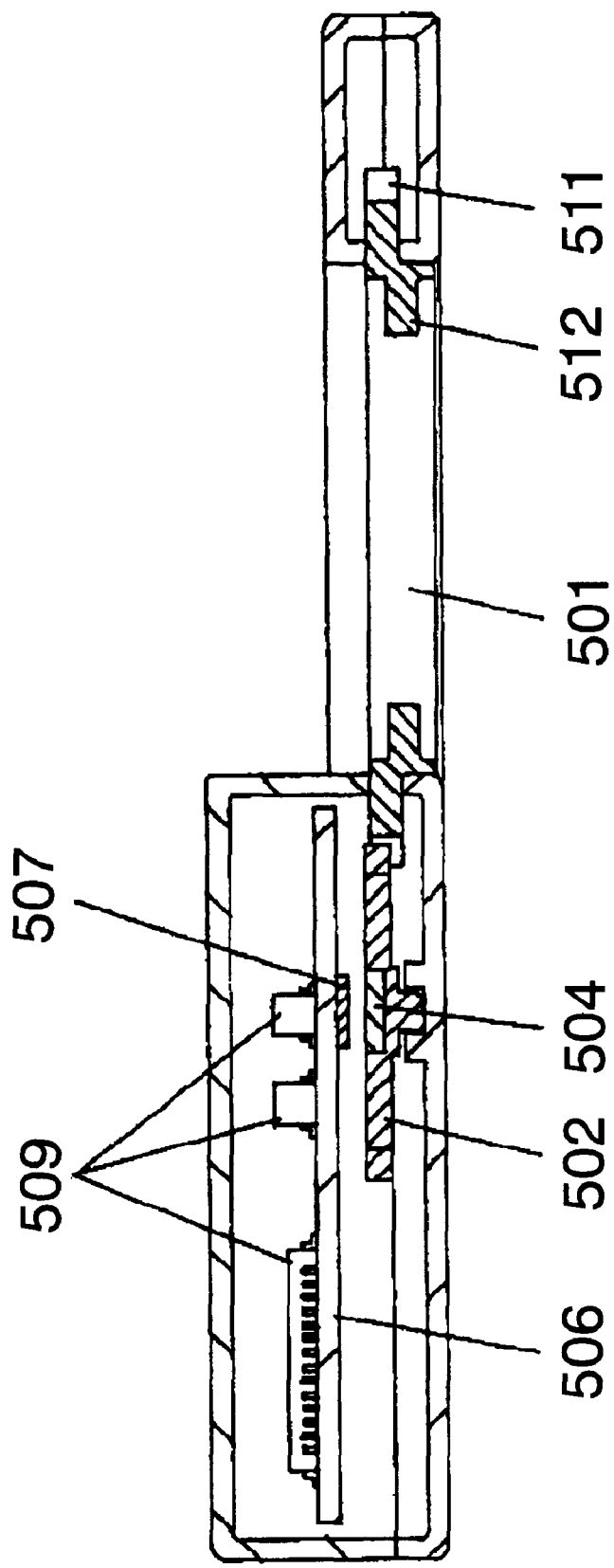
FIG. 12 is a sectional view of the detector shown in FIG. 11.
Figure 14A:
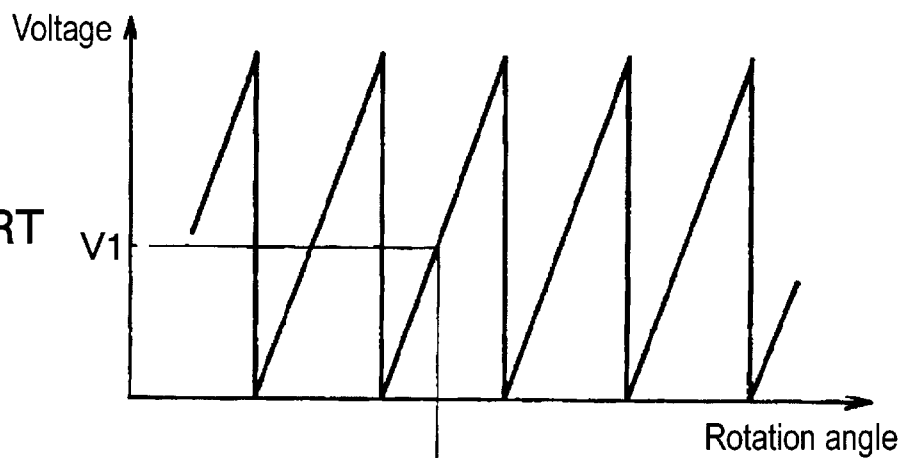
FIGS. 14A and 14B show enlarged voltage-waveforms shown in FIGS. 13A and 13B.
Figure 14B:
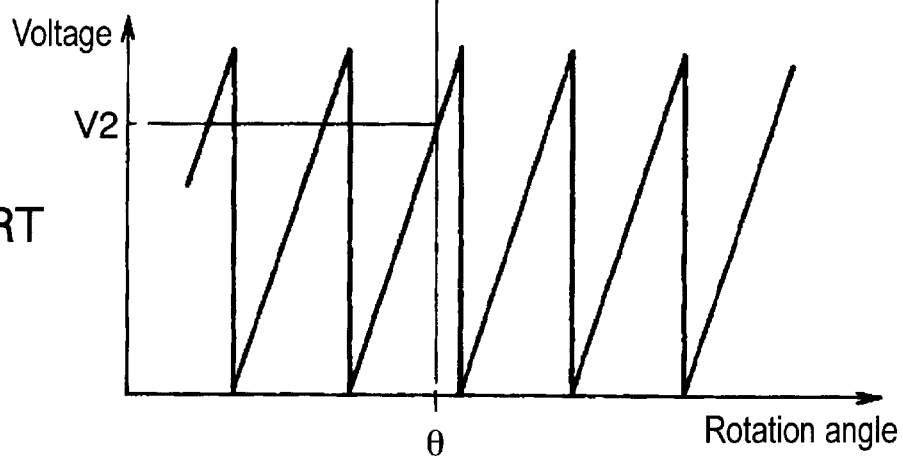

FIGS. 10A and 10B show enlarged voltage-waveforms of a rotation-angle detector in accordance with the sixth embodiment of the present invention. Any structures previously discussed can be applied to this detector.

In the rotation-angle detector in accordance with the sixth embodiment, a first detection signal—increasing gradually or decreasing—detected by the first detector is divided into given sections based on a repeating continuous waveform detected by the second detector. When the first signal takes a value near to a section, a value of the first detection signal is determined with the second detection signal. Therefore, even if the first detection signal detected by the first detector has a deviation, a rotation-angle having a smaller detection error can be detected.

This is further detailed hereinafter with reference to FIGS. 10A and 10B. A linear reference voltage-waveform L0 shown in FIG. 10A and supplied from the first detector is divided into given voltage sections V1, V2 and V3 based on the voltage-waveform (repeating and continuous waveform) shown in FIG. 10B and supplied from the second detector. Detecting circuit 20 then stores this data.

When arbitrary rotation-angle θ of rotary body 1 is detected, a waveform, such as waveform L1 as shown in FIG. 10A, deviated from the reference waveform L0 may be drawn. In this case, detecting circuit 20 detects voltage "v2" from voltage-waveform L1, where "v2" exceeds V2, although circuit 20 should have detected voltage "v1" between V1 and V2.

At this time, detecting circuit 20 detects voltage "v3" from the waveform shown in FIG. 10B although it should have detected voltage "v4" because of "v2" which is detected from the waveform shown in FIG. 10A. This mechanism allows detecting circuit 20 to determine the voltage value of the first detection signal as being between voltages V1 and V2, i.e., voltage "v1" based on voltages "v2", "v3" and "v4". Voltage "v2" somewhat exceeds V2, voltage "v3" is a waveform between V1 and V2, and voltage "v4" is a waveform between V2 and V3 next to the waveform of "v3".

In other words, detecting circuit 20 determines whether the output value from the first detector is reference voltage "v1" or voltage "v2" based on voltage "v3" from the second detector, so that the rotation-angle detector can detect a rotation-angle with a smaller detection error even if the detection signal detected by the first detector has deviation.

When detecting circuit 20 carries out such calculations, an accuracy of the first detector can be as low as one third of the detecting accuracy of the 45 degree rotation which is a period of the second detection signal. Therefore, components constituting the first detector can be general-use components and not necessarily precision components. As a result, an inexpensive rotation-angle detector can be expected.

In the above description, the first detection signal draws a waveform gradually increasing, following the movement of the rotary body. However, the waveform can be gradually decreasing with similar advantages, following the movement of the rotary body.

What is claimed is:

1. A rotation-angle detector comprising:
   a rotary body having a rotary gear,
   a change gear engaging said rotary gear;
   a driven body operable to move based on a rotation of said change gear;
   a first detector for detecting a movement of said driven body as a first detection signal, said first detection signal either increasing gradually or decreasing gradually;
   a detecting gear engaging said change gear,
   a second detector for detecting a rotation of said detecting gear as a second detection signal repeating continuously; and
   a detecting circuit for processing said first detection signal and said second detection signal supplied from said first detector and said second detector, respectively, and said detecting circuit operable to detect a rotation angle of said rotary body based on both said first detection signal and said second detection signal.

2. The rotation-angle detector of claim 1, wherein said driven body comprises a driven gear.

3. The rotation-angle detector of claim 1, wherein each of said first detector and said second detector include a magnet and a magnetism detecting element.

4. The rotation-angle detector of claim 1, wherein said first detection signal is divided into sections based on a waveform detected by said second detector, and when said first detection signal has a value near to a boundary between said sections, said detecting circuit determines a value of said first detection signal based on a value of said second detection signal.

5. The rotation-angle detector of claim 1, wherein said detecting gear has a magnet mounted at a center of rotation thereof, said second detector including said magnet and a magnetism detecting element mounted so as to face said magnet.

6. A rotation-angle detector comprising:
   a rotary body having a rotary gear;
   a detecting gear engaging said rotary gear;
   a change gear engaging said detecting gear;
   a driven body operable to move based on a rotation of said change gear;
   a first detector for detecting a movement of said driven body as a first detection signal, said first detection signal either increasing gradually or decreasing gradually,
   a second detector for detecting a rotation of said detecting gear as a second detection signal repeating continuously; and
   a detecting circuit for processing said first detection signal and said second detection signal supplied from said first detector and said second detector, respectively, and said detecting circuit operable to detect a rotation angle of said rotary body based on both said first detection signal and said second detection signal.

7. The rotation-angle detector of claim 6, wherein said driven body comprises a driven gear.

8. The rotation-angle detector of claim 6, wherein each of said first detector and said second detector include a magnet and a magnetism detecting element.

9. The rotation-angle detector of claim 6, wherein said first detection signal is divided into sections based on a waveform detected by said second detector, and when said first detection signal has a value near to a boundary between said sections, said detecting circuit determines a value of said first detection signal based on a value of said second detection signal.

10. The rotation-angle detector of claim 6, wherein said detecting gear has a magnet mounted at a center of rotation thereof, said second detector including said magnet and a magnetism detecting element mounted so as to face said magnet.

11. A rotation-angle detector comprising:
    a rotary body having a rotary gear;
    a change gear engaging said rotary gear;
    a detecting gear engaging said rotary gear;
    a driven body operable to move based on a rotation of said change gear;
    a first detector for detecting a movement of said driven body as a first detection signal, said first detection signal either increasing gradually or decreasing gradually;
    a second detector for detecting a rotation of said detecting gear as a second detection signal repeating continuously; and
    a detecting circuit for processing said first detection signal and said second detection signal supplied from said first detector and said second detector, respectively, and said detecting circuit operable to detect a rotation angle of said rotary body based on both said first detection signal and said second detection signal.

12. The rotation-angle detector of claim 11, wherein said driven body comprises a driven gear.

13. The rotation-angle detector of claim 11, wherein each of said first detector and said second detector include a magnet and a magnetism detecting element.

14. The rotation-angle detector of claim 11, wherein said first detection signal is divided into sections based on a waveform detected by said second detector, and when said first detection signal has a value near to a boundary between said sections, said detecting circuit determines a value of said first detection signal based on a value of said second detection signal.

15. The rotation-angle detector of claim 11, wherein said detecting gear has a magnet mounted at a center of rotation thereof, said second detector including said magnet and a magnetism detecting element mounted so as to face said magnet.

16. A rotation-angle detector comprising:

a rotary body having a rotary gear;

a detecting gear engaging said rotary gear;

a driven body operable to move based on a rotation of said detecting gear;

a first detector for detecting a movement of said driven body as a first detection signal, said first detection signal either increasing gradually or decreasing gradually;

a second detector for detecting a rotation of said detecting gear as a second detection signal repeating continuously; and a detecting circuit for processing said first detection signal and said second detection signal supplied from said first detector and said second detector, respectively, and said detecting circuit operable to detect a rotation angle of said rotary body based on both said first detection signal and said second detection signal.

17. The rotation-angle detector of claim 16, wherein said driven body comprises a driven gear.

18. The rotation-angle detector of claim 16, wherein each of said first detector and said second detector include a magnet and a magnetism detecting element.

19. The rotation-angle detector of claim 16, wherein said first detection signal is divided into sections based on a waveform detected by said second detector, and when said first detection signal has a value near to a boundary between said sections, said detecting circuit determines a value of said first detection signal based on a value of said second detection signal.

20. The rotation-angle detector of claim 16, wherein said detecting gear has a magnet mounted at a center of rotation thereof, said second detector including said magnet and a magnetism detecting element mounted so as to face said magnet.

* * * * *

UNITED STATES PATENT AND TRADEMARK OFFICE
CERTIFICATE OF CORRECTION

PATENT NO. : 6,630,823 B2
DATED : October 7, 2003
INVENTOR(S) : Ichiro Tateishi et al.

It is certified that error appears in the above-identified patent and that said Letters Patent is hereby corrected as shown below:

Column 7,
Line 33, please replace "rotary gear," with -- rotary gear; --.
Line 41, please replace "change gear," with -- change gear; --.

Column 8,
Line 10, please replace "gradually," with -- gradually; --.

Signed and Sealed this

Twenty-fourth Day of February, 2004

JON W. DUDAS
*Acting Director of the United States Patent and Trademark Office*